Oct. 2, 1945.　　　　K. K. NAHIGYAN　　　　2,385,833
FUEL VAPORIZER FOR JET PROPULSION UNITS
Filed Jan. 27, 1943
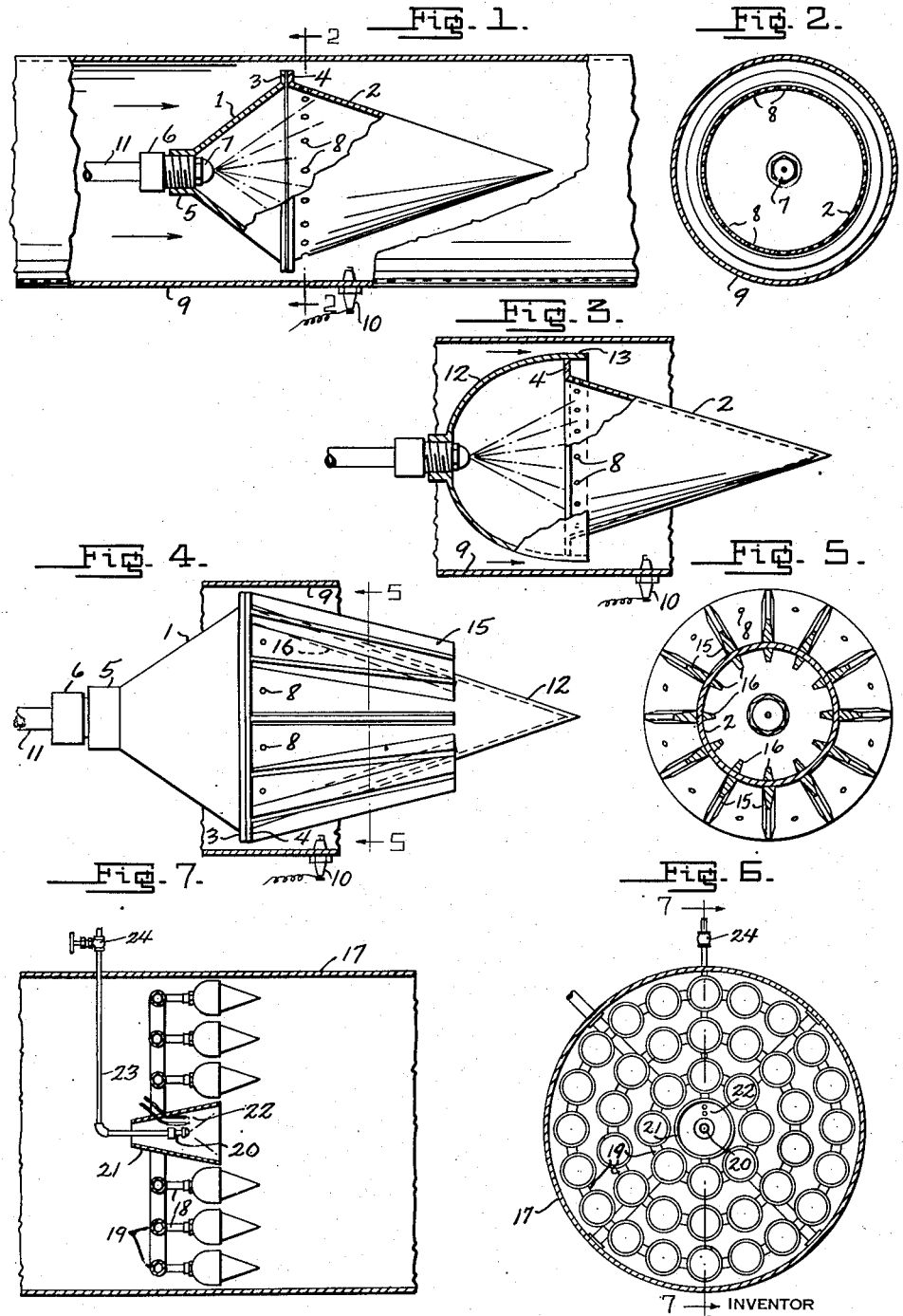
INVENTOR
Kevork K. Nahigyan
BY
ATTORNEY Patented Oct. 2, 1945

2,385,833

UNITED STATES PATENT OFFICE 2,385,833

FUEL VAPORIZER FOR JET PROPULSION UNITS

Kevork K. Nahigyan, Hampton, Va.

Application January 27, 1943, Serial No. 473,705

9 Claims. (Cl. 158—53)

(Granted under the act of March 3, 1883, as amended April 30, 1928; 370 O. G. 757)

This invention relates in general to jet propulsion motors and in particular to an improved construction for a fuel vaporizer used in the combustion duct thereof.

In jet propulsion motors of the class described, air is inducted at a relatively high velocity through a suitable opening at the forward part of the motor either by forward motion of the aircraft or other vehicle upon which the motor is installed or augmented by a suitable power driven blower. The air stream thus inducted is heated by the burning of fuel issuing from a vaporizer situated in the path of the air stream through the motor to further increase its velocity and then discharged rearwardly of the motor to thereby impart a forward thrust to the vehicle.

The velocity of the air column moving through the combustion duct of a jet-propulsion motor is extremely high as compared to the air velocities through other known devices utilizing fuel vaporizers. The performance of jet-propulsion systems in aircraft use is sensitive to the drag imposed on the air stream by the vaporizers. Furthermore, the efficiency of a jet-propulsion motor depends largely on the completeness of the fuel combustion within the limited space ordinarily available in an efficient aircraft installation. The weight of the vaporizer is also of primary consideration in an aircraft installation.

The aforesaid reason for a limited combustion space necessitates extremely high heat liberation. It is important, therefore, to burn the fuel with a non-luminous flame in order to minimize the radiant heat transferred to the walls of the combustion chamber from a given temperature flame.

In summation, the requirements of a fuel vaporizer suitable for aircraft jet-propulsion motors are that it effect the burning of the fuel efficiently and rapidly with a non-luminous flame in high-velocity air streams, that it be compact and light in construction, and of such profile that it imposes a negligible drag on the air stream.

The general object of this invention therefore is to provide an improved fuel vaporizing device for burning liquid fuels rapidly and efficiently in the relatively high velocity air stream flowing through the air duct of a jet propulsion motor.

A further object of this invention is to provide a fuel vaporizing device which will produce a high temperature flame which has a minimum of radiant heat for the given flame temperature. Such a device has particular application to services where a minimum of heat transfer from the flame to the surrounding walls of a combustion chamber are desired.

Another object of this invention is to provide an improved fuel vaporizing device of light construction, and with a streamlined profile with the direction of the air flow to impose a minimum of drag on the air stream.

Still a further object of this invention is to provide an improved device which is simple and economical to construct, easy to operate and to maintain, and dependable in prolonged service.

With the foregoing and other objects in view, as will hereinafter become apparent, this invention comprises the constructions, combinations, and arrangements of parts, hereinafter set forth disclosed and shown on the accompanying drawing, wherein;

Fig. 1 is a longitudinal view of a single-unit burner shown partly in cross section;

Fig. 2 is a cross-sectional end view taken at line 2—2 of Fig. 1;

Fig. 3 is a longitudinal view of a modification in the construction of the vaporizing chamber shown partly in cross section;

Fig. 4 is a longitudinal view of a further modification in the construction of the vaporizing chamber;

Fig. 5 is a cross-sectional end view taken at line 5—5 of Fig. 4;

Fig. 6 is an end view of the arrangement of a multiplicity of vaporizers in a duct; and Fig. 7 is an elevational view taken at cross-section line 7—7 in Fig. 6 of an arrangement of a multiplicity of vaporizers.

Figures 1 and 2 show one embodiment of my invention comprising a chamber formed of two hollow cones 1 and 2 made of a suitable sheet metal and fastened base to base by joining flanges 3 and 4 provided at the bases of cones 1 and 2, respectively. The joining of the flanges 3 and 4 may be done by welding, by bolting, or by any other acceptable method to form a substantially gas-tight joint. Cone 1 is provided with a collar 5 shown threaded, but which may be constructed otherwise, to clamp over the barrel 6 of a fuel atomizing nozzle 7. In the wall of the cone 2 constituting the after-part of the vaporizing chamber a multiplicity of orifices 8 are drilled in suitable size and numbers on a circumference at a proper distance rearward of the flange 4.

The vaporizer chamber is installed in an air duct 9 through the body of a jet propulsion motor so that the longitudinal axis of the vaporizer falls approximately on the longitudinal axis of the duct or runs approximately parallel to it. A spark plug 10 inserted through the wall of the air duct provides a convenient means for initially lighting the burner. It is obvious that a torch or any other convenient ignition device may be used without deviating from the spirit of this invention.

Liquid fuel under pressure enters the barrel 6 of the atomizing nozzle 7 through pipe 11. Finely, atomized fuel discharged from the nozzle 7 into the vaporizing chamber sprays the inside wall of the rearward cone 2. The liquid fuel collected over the cold wall surface of the chamber collects and drips by gravity through the several orifices 8 located at the lowest part of the chamber. The issuing liquid fuel is ignited by the spark plug 10 or by any of several suitable ignition devices heretofore mentioned as it drips into the space provided between the lower extremities of the chamber and the inside wall of the air duct. The ignited fuel burns in the space surrounding the rearward part of the vaporizing chamber, thereby heating the walls of the said chamber. As the walls of the vaporizing chamber are heated the fuel issuing from the orifices 8 is gradually changed to vapor form. The velocity of the air stream passing through duct 9 is increased as the rate of vaporization of the fuel increases. As the high velocity air stream flows over the edges of flanges 3 and 4 eddies are created on the downstream side of the flanges which help the rapid mixing of the air and the fuel vapors issuing from orifices 8 for burning. The presence of the flanges 3 and 4 provides a sheltered zone in the air stream adjacent to the rearward walls of the vaporizing chamber where the mixture of air and fuel vapors ignite and burn with a blue flame. The rearward walls of the vaporizing chamber are maintained hot by the flame surrounding the said walls. It will be observed that in the absence of air inside the vaporizing chamber the fuel vapors cannot ignite inside of the said chamber; consequently, the temperatures of the walls of the chamber may be allowed to rise to any point within the range of the temperature resistance of the metal from which the chamber walls are fabricated.

It will also be observed that the higher the velocity of the air stream in the duct 9 the more are the turbulences created by the flanges 3 and 4, hence the more rapid becomes the mixing of the fuel vapor and air which results in more rapid combustion.

It will be observed that although in Figure 1 flanges 3 and 4 are shown in a plane perpendicular to the longitudinal axis of the vaporizing chamber, many modifications in the arrangement of the said flanges or an equivalent ridge to create turbulence and to provide a sheltered zone adjacent to the fuel vapor orifices 8 are possible and within the spirit of this invention.

It will also be observed that although in Fig. 1 I have shown two hollow cones fastened base to base to constitute a vaporizing chamber, other shapes such as hollow pyramids, hollow spheres, or a cylindrical shaped housing having a bell shaped head upstream and a cone shaped tail downstream can be used for a vaporizing chamber without departing from the spirit of this invention.

Figure 3 illustrates a modification in the construction of the vaporizing chamber where the forward wall 12 of the vaporizing chamber has been streamlined according to accepted aerodynamic principles to minimize the drag of the vaporizing chamber in the high-velocity air stream. The lip 13 of the bell-shaped forward housing extends over the edge of the flange 4 of the rearward cone 2 until it overlaps rearward the plane of the circle of the fuel vapor orifices 8. Lip 13 fulfills the functions of flanges 3 and 4 in Figure 1, in creating the necessary turbulence in the air stream, also in providing the sheltered region in the vicinity where the fuel vapors are issued through the orifices 8.

In Figures 4 and 5 is illustrated a further modification of the rearward wall 2 of the vaporizing chamber where a multiplicity of radial fins 15 and 16 with their planes running parallel to the longitudinal axis of the vaporizing chamber, are cast, welded, or otherwise fastened to the outside and inside of the wall, respectively, in intimate contact with the said wall. Heat absorbed by the outer fins 15 from burning gases is conducted to the vaporizer chamber wall and to the inner fins 16 where the heat is transmitted to the sprayed fuel. The extra heat thus absorbed by the fins 15 connected to the outer surfaces of the vaporizing chamber wall and the extra surfaces exposed by the inner fins 16 to the fuel spray increase the fuel vaporizing capacity of a chamber without unduly increasing its displacement in the air stream.

It is obvious that the use of fins attached to the wall surfaces of a vaporizing chamber may be varied to the use of only outer fins, or to the use of only inner fins, or to the use of both sets of fins without departing from the intentions of this invention.

It will be observed that, although in Figures 4 and 5 are shown solid fins attached to the outside and inside of the vaporizing chamber wall, the same results can be accomplished by scalloping, crimping or otherwise shaping the vaporizer chamber walls rearward of the fuel vapor orifices in such a manner as to provide additional heat-absorbing surfaces outside of the walls of the vaporizer chamber, and to provide additional surfaces inside of the chamber exposed to the fuel spray, thereby increasing the vaporizing capacity of a chamber without unduly increasing its displacement in the air stream, and that such variations in the construction of the vaporizer walls of the chamber do not deviate from the intentions of this invention.

In Figures 6 and 7 is shown an arrangement of a multiplicity of vaporizing units so arranged as to constitute a burner inside of a duct 17 having large cross-sectional area. Although many arrangements are possible, I have shown by way of illustration an arrangement where the fuel vaporizing chambers are arranged in concentric rows. The vaporizer chambers are connected by means of tail pipes 18 to annular headers 19, which are connected to the fuel supply under pressure. Headers 19 also constitute a frame work which supports the entire bank of vaporizing chambers.

For initiating combustion in a multiple unit burner arrangement shown in Figures 6 and 7, a pilot burner may be used consisting of a suitable fuel atomizing nozzle 20 mounted horizontally in the axis of a diverging duct 21, and a suitable ignition device 22. Pipe 23 supplying the liquid fuel under pressure to nozzle 20 may preferably be provided with an individual shut-off valve 24 so that the pilot burner can be operated independently of the rest of the burners.

Diverging duct 21 provides a partially sheltered zone of low-velocity air stream where the fuel spray from the atomizing nozzle 20 ignites by means of the ignition device 22, and continues to burn. The flame issuing from the rearward opening of the diverging duct 21 helps to warm the walls of the adjacent row of vaporizing chambers. When fuel is turned on into the vaporizing chambers, the liquid fuel dripping out of the vapor orifices in the said chambers is ignited by the flame issuing from the pilot burner. The resulting body of the flame filling the large duct 17 heats the rearward walls of the entire bank of vaporizing chambers so that almost instantaneously the cycle of generating and burning fuel vapors is built throughout the entire bank of burner units.

The novel features and the operation of this device will be apparent from the foregoing description. While the device has been shown and the structure described in detail, it is obvious that this is not to be considered limited to the exact form disclosed, and that changes may be made therein within the scope of what is claimed without departing from the spirit of the invention.

The invention described herein may be manufactured and used by or for the Government of the United States of America for governmental purposes without the payment of any royalties thereon or therefor.

What I claim is:

1. For use in a jet propulsion device including a duct adapted to have an air stream passed therethrough; a liquid fuel vaporizer, said fuel vaporizer comprising, a casing having a streamlined outer portion with a plurality of apertures therein, said casing being adapted to be placed in said duct with the streamlined portion thereof facing downstream, means for injecting liquid fuel into said casing to be vaporized whereby said fuel may be discharged in vapor form outwardly through said apertures for ignition, and a shield member disposed on said casing adjacent said apertures and on the upstream side thereof for providing a region of reduced air velocity and high turbulence in the vicinity of said apertures.

2. The combination in claim 1 and further including a plurality of fin-like members upstanding from the exterior wall of said casing.

3. The combination in claim 1 and further including a plurality of fin-like members extending inwardly from the interior wall of said casing.

4. The combination in claim 1 and further including a plurality of fin-like members upstanding from the exterior surface of said casing, and a plurality of fine-like members extending inwardly from the interior surface of said casing.

5. The combination in claim 1 wherein the portion of said casing on the upstream side of said shield member is bell shaped.

6. For use in a jet propulsion device including a duct adapted to have an air stream passed therethrough; a liquid fuel vaporizer, said fuel vaporizer comprising, a casing having a streamlined outer portion with a plurality of apertures therein, said casing being adapted to be placed in said duct with the streamlined portion thereof facing downstream, means for spraying liquid fuel into said casing to be vaporized whereby said fuel may be discharged in vapor form outwardly through said apertures, and a shield member disposed on said casing adjacent said apertures and on the upstream side thereof for providing a region of reduced air velocity and high turbulence in the vicinity of said apertures.

7. For use in a jet propulsion device including a duct adapted to have an air stream passed therethrough; a liquid fuel vaporizer, said fuel vaporizer comprising, a casing having a pointed tapered portion with a plurality of apertures therein, said casing being adapted to be placed in said duct with the point of the tapered portion thereof facing downstream, means for injecting liquid fuel into said casing to be vaporized whereby said fuel may be discharged in vapor form outwardly through said apertures, and a shield member disposed on said casing adjacent said apertures and on the upstream side thereof for providing a region of reduced air velocity and high turbulence in the vicinity of said apertures.

8. For use in a jet propulsion device including a duct adapted to have an air stream passed therethrough; a liquid fuel vaporizer, said fuel vaporizer comprising, first and second conical casings, each having a flange at the base thereof, means connecting together the flange portions to form a chamber, said casings being adapted to be placed in said duct with the longitudinal axes thereof parallel to the duct axis, and means for injecting liquid fuel into said chamber to be vaporized, said casing on the downstream side of said flange having apertures in the wall adjacent said flange to discharge said fuel in vapor form outwardly therethrough.

9. For use in a jet propulsion device including a duct adapted to have an air stream passed therethrough; a liquid fuel vaporizer device, said device comprising, a plurality of concentrically arranged arcuate rows of header pipes adapted to be connected to a liquid fuel supply source, a plurality of pipe stubs protruding from each said header pipe, a vaporizer casing supported upon each of said pipe stubs, each said stub terminating within the casing associated therewith, said casings each having a pointed tapered portion adapted to face downstream in said duct and provided with a plurality of apertures therein, nozzle means connected to the casing end of each pipe stub for injecting liquid fuel into each said casing to be vaporized whereby said fuel may be discharged in vapor form outwardly through said apertures, and a shield member for each said casing, said shield members being disposed on said casings adjacent said apertures and on the upstream side thereof for providing a region of reduced air velocity and high turbulence in the vicinity of said apertures.

KEVORK K. NAHIGYAN.